United States Patent [19]
Fischbach

[11] Patent Number: 5,489,146
[45] Date of Patent: Feb. 6, 1996

[54] SUBSTITUTE TOP FOR CONVERTIBLES

[75] Inventor: Roderick C. Fischbach, Ann Arbor, Mich.

[73] Assignee: Dura Convertible Systems, Inc., Adrian, Mich.

[21] Appl. No.: 305,414

[22] Filed: Sep. 13, 1994

Related U.S. Application Data

[63] Continuation of Ser. No. 78,349, Jun. 21, 1993, abandoned.

[51] Int. Cl.$^6$ .................................................... B62D 25/06
[52] U.S. Cl. ........................................... 296/102; 296/210
[58] Field of Search ..................................... 296/102, 103, 296/136, 210

[56] References Cited

U.S. PATENT DOCUMENTS

| | | | |
|---|---|---|---|
| 2,479,825 | 8/1949 | Fleischhauer | 296/136 X |
| 2,511,460 | 6/1950 | Cancelli et al. | 296/102 |
| 3,175,859 | 3/1965 | Abodeely | 296/136 |
| 3,216,763 | 11/1965 | Heincelman | 296/121 |
| 3,241,877 | 3/1966 | Tate | 296/136 |
| 3,328,073 | 6/1967 | Einhorn | 296/136 |
| 3,608,956 | 9/1971 | Adamski | 296/117 |
| 4,154,473 | 5/1979 | Alexander et al. | 296/137 R |
| 5,033,788 | 7/1991 | Raj | 296/136 |

FOREIGN PATENT DOCUMENTS

| | | | |
|---|---|---|---|
| 1271393 | 7/1961 | France | 296/210 |
| 2229142 | 9/1990 | United Kingdom | B60J 7/10 |

Primary Examiner—Dennis H. Pedder
Assistant Examiner—Gary C. Hoge
Attorney, Agent, or Firm—David A. Greenlee

[57] ABSTRACT

A substitute top is provided to close the passenger compartment of a convertible vehicle when the folding soft top is lowered. The soft top has a pair of J-hook latches for engaging the windshield header to latch the top in sealing engagement with the windshield header. The substitute top comprises a rigid shell that has a front edge which engages the windshield header when the shell is installed. The substitute top mounts a pair of J-hook latches for engaging the header in the same manner as the soft top when the substitute top is installed to latch the substitute top in sealing engagement with the windshield header. The substitute top includes a bottom portion having a rear edge that mounts a seal strip which engages the vehicle body adjacent the top storage compartment. A C-shaped clip engages the storage well rear edge to secure the bottom portion to the vehicle body and compress the seal strip. Side flanges engage the soft top storage well side edges to locate the substitute top laterally of the vehicle. The substitute top is installed by positioning the shell over the passenger compartment, moving the shell rearward to engage the C-clip with the well periphery, dropping the shell front edge into engagement with the windshield header, and latching the J-hook latches.

8 Claims, 3 Drawing Sheets

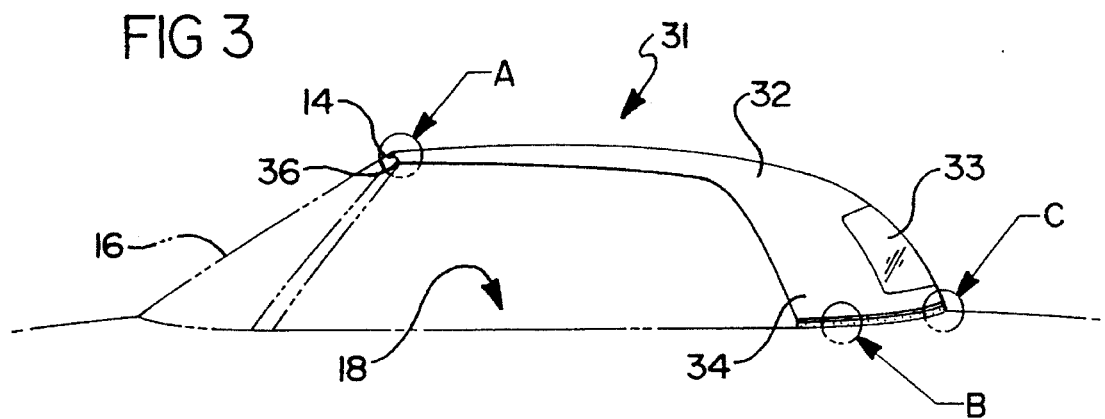
FIG 3
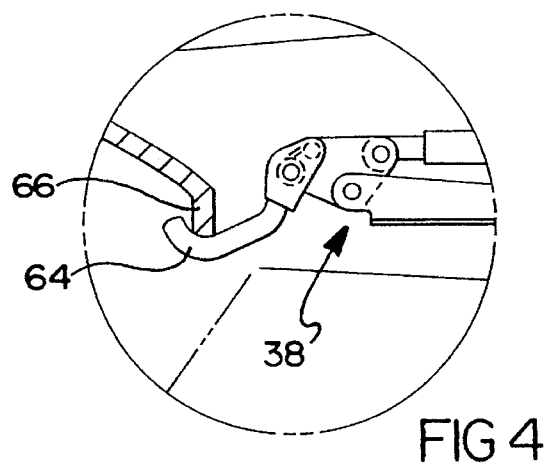
FIG 4
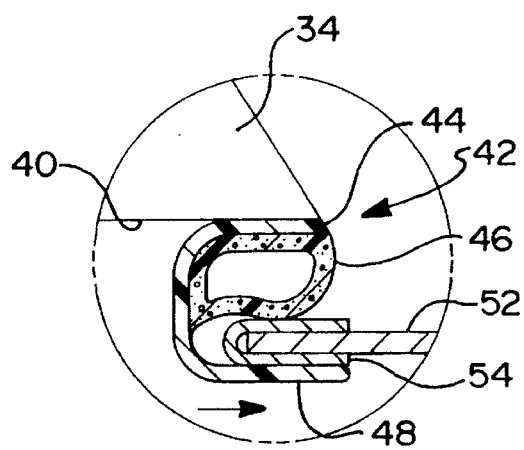
FIG 5
FIG 6

SUBSTITUTE TOP FOR CONVERTIBLES

This application is a continuation of Ser. No. 08/078,349, filed Jun. 21, 1993, now abandoned

BACKGROUND OF THE INVENTION

This invention relates generally to convertible vehicles and, more particularly, to a substitute top for covering the vehicle passenger compartment when the folding soft top is stored.

Convertible vehicles are becoming more popular with the motoring public. These vehicles have the advantage of being able to quickly and easily convert from a closed sedan mode to an open roadster mode by folding and storing a collapsible soft top. In the event of inclement weather, such as rain or cold temperatures, the top can be easily and quickly unfolded and raised to close the passenger compartment and become a barrier against the weather.

While the unfolded, raised soft top is effective to protect the passengers from inclement weather, the top fabric does not weather well. Harsh winter weather, including exposure to snow and ice and to freezing and thawing, is especially wearing on the exposed convertible top fabric cover. Also, the top fabric is stretched when the top is raised and cold temperatures tends to stiffen and shrink the fabric. This results in increased stress and wear to the fabric, causing aesthetic degradation and deterioration in its ability to serve as a weather barrier. Prudent maintenance necessitates top replacement after several years use.

One way to improve top life is to store the vehicle during winter weather and treat the convertible vehicle as a fair weather vehicle only. However, this severely limits the utility of the convertible. With the burgeoning popularity of convertibles, manufacturers are producing an ever-increasing number of inexpensive convertibles. These are usually purchased by young motorists who utilize their convertible as their only vehicle. Thus, winter storage is impractical, since the vehicle must be driven year-round. It is necessary to improve weather resistance for the convertible top to increase utility and salability of convertibles.

One solution developed by manufacturers was a folding hardtop. One of these comprises a hardtop covering for the passenger compartment which has several rigid sections that fold. Because these segments are not flexible, they normally require the entire trunk for storage. The only recent commercial embodiment was produced by Ford Motor Company in the 1950's. It proved commercially unsuccessful and was dropped.

Another solution was to provide an overtop. In this type vehicle, a hard shell is installed over the raised soft top, using the soft top as a base. This arrangement improves weatherability of the vehicle, but produces a bulky appearance and does not eliminate cold weather shrinkage and stressing of the top fabric.

To improve the life of the fabric soft top and to provide a better weather barrier, substitute tops have been developed to close the passenger compartment without raising the soft top. These substitute tops are often referred to as hardtops, since they utilize a shell made of steel, fiberglass or aluminum which are harder than the soft fabric tops. These tops, however, have required special latches and fittings, resulting in a complicated procedure for installing and removing them.

Accordingly, it would be desirable to provide a substitute top for a convertible vehicle which is simple and easy to install and remove and which utilizes the same latch mechanism utilized by the soft top only.

SUMMARY OF THE INVENTION

It is therefore an object of this invention to provide a substitute top for a convertible vehicle which is simple and easy to install and remove and which utilizes the same latch mechanism utilized by the soft top only.

In one aspect, this invention features a substitute top for a convertible vehicle which has a body enclosing a passenger compartment, a top storage well having side and rear edges, a windshield including a header, and a folding soft top movable between a raised position closing the compartment and a lowered position stored in the top storage well, and latch means carried by the top are operable in top raised position for engaging the header to latch the top in sealing engagement with the windshield header. The substitute top closes the passenger compartment when the soft top is lowered, and comprises a shell having a front edge which engages the windshield header when the shell is installed in a position covering the passenger compartment and a bottom portion including a rear edge which engages with the vehicle body adjacent the top storage compartment. Second latch means are mounted on the shell for engaging the header when the substitute top is installed to latch the substitute top in sealing engagement with the windshield header. Flange means mounted on the bottom portion engage the storage well edges to secure and locate the bottom portion on the body.

Preferably, the first and second latch means are J-hook latches mounted at the sides of both tops, the flange means comprise a C-shaped clip engageable with the storage well rear edge to clamp the bottom portion to the body, and side flanges engageable with storage well side edges to locate the substitute top laterally of the vehicle. Also, a peripheral seal is carried by the bottom portion and sealingly engages the body about the storage well when the substitute top is installed.

In another aspect, this invention features a substitute top for a convertible vehicle which has a body enclosing a passenger compartment, a top storage well, a windshield including a header, a folding soft top movable between a raised position closing the compartment and a lowered position stored in the top storage well, and a pair of J-hook latches carried by the top for engaging the header to latch the top in sealing engagement with the windshield header. The substitute top closes the passenger compartment when the soft top is lowered, and comprises a rigid shell having a front edge engageable with the windshield header when the shell is installed in a position covering the passenger compartment and having a bottom portion including a rear edge engageable with the vehicle body adjacent the top storage compartment. A second pair of J-hook latches are mounted on the shell for engaging the header when the substitute top is installed to latch the substitute top in sealing engagement with the windshield header. The substitute top has a C-shaped clip engageable with the storage well rear edge to clamp the bottom portion to the body, side flanges engageable with storage well side edges to locate the substitute top laterally of the vehicle, and a peripheral seal carried by the bottom portion and sealingly engaging the body about the storage well when the substitute top is installed.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 3 is a view similar to FIG. 1, but shown with a substitute top according to this invention installed;

FIG. 4 is an enlarged detail view of that portion of FIG. 3 designated A;

FIG. 5 is an enlarged detail view of that portion of FIG. 3 designated B;

FIG. 6 is an enlarged detail view of that portion of FIG. 3 designated C;

DETAILED DESCRIPTION OF A PREFERRED EMBODIMENT

Figure 1:
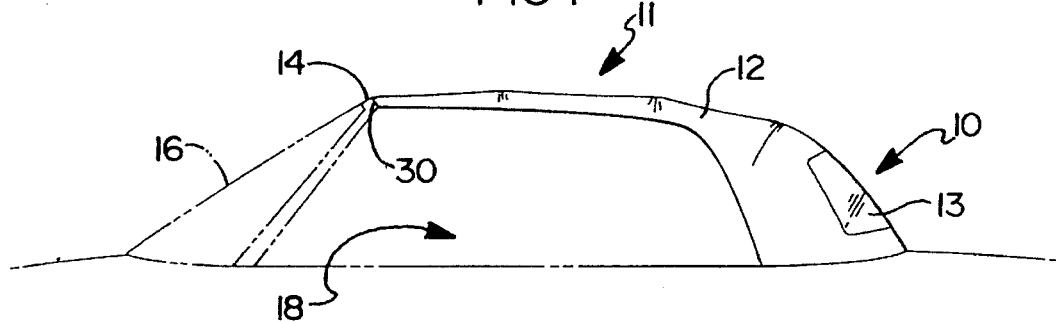
FIG. 1 is a partial side elevation of a convertible vehicle, shown with the soft top raised.
Figure 2:
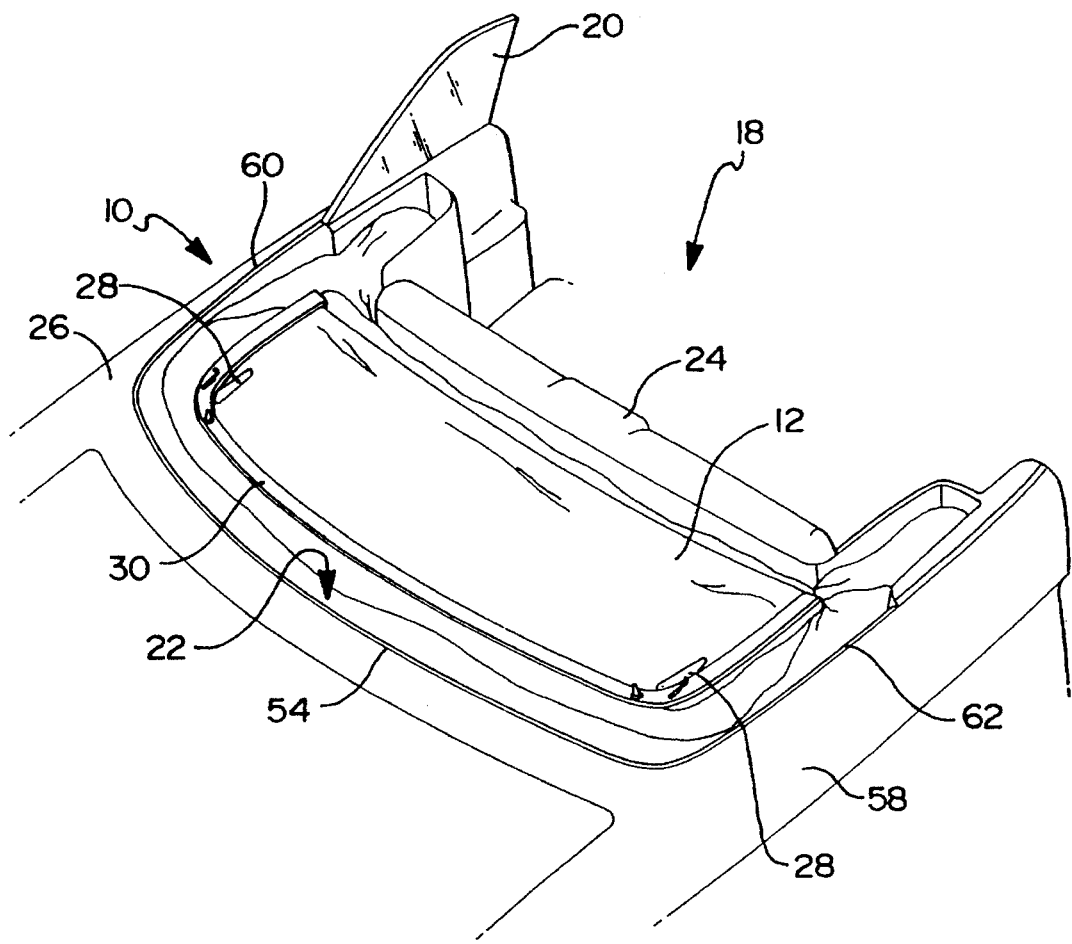
FIG. 2 is a partial perspective view of the convertible vehicle of FIG. 1, with the soft top shown folded and lowered.

As shown in FIGS. 1 and 2 of the drawings, a convertible vehicle 10 has a conventional soft convertible top 11 comprising a folding linkage (not shown) covered by a fabric cover 12 and having a backlite 13, which may be raised to engage a header 14 of the vehicle windshield 16 to close the vehicles's passenger compartment 18. In raised position, top 11 seals against the tops of the usual side door windows (not illustrated) and rear quarter windows, of which only the left one 20 is shown.

When it is desired to raise soft top 11, a conventional manual or power operator, such as illustrated in U.S. Pat. No. 3,608,956—Adamski, is operated to bring top header 30 into close proximity of windshield header 14. J-hook latches 28 are then closed in a well-known manner, as shown for example in U.S. Pat. No. 3,216,763—Heincelman, to secure the headers together. By closing the vehicle side windows, vehicle 10 becomes a closed sedan, with soft convertible top 11 providing a barrier for the vehicle occupants against inclement weather.

When weather permits, soft top 11 can be easily folded by releasing latches 28 and operating the manual or power operator to lower soft top 11. Folded soft top 11 is stored in a top storage well 22 located behind passenger rear seat back 24 in the vehicle body 26. Stored soft top 11 can then be covered by a conventional tonneau (not shown) to convert vehicle 10 to its open roadster mode.

Figure 7:
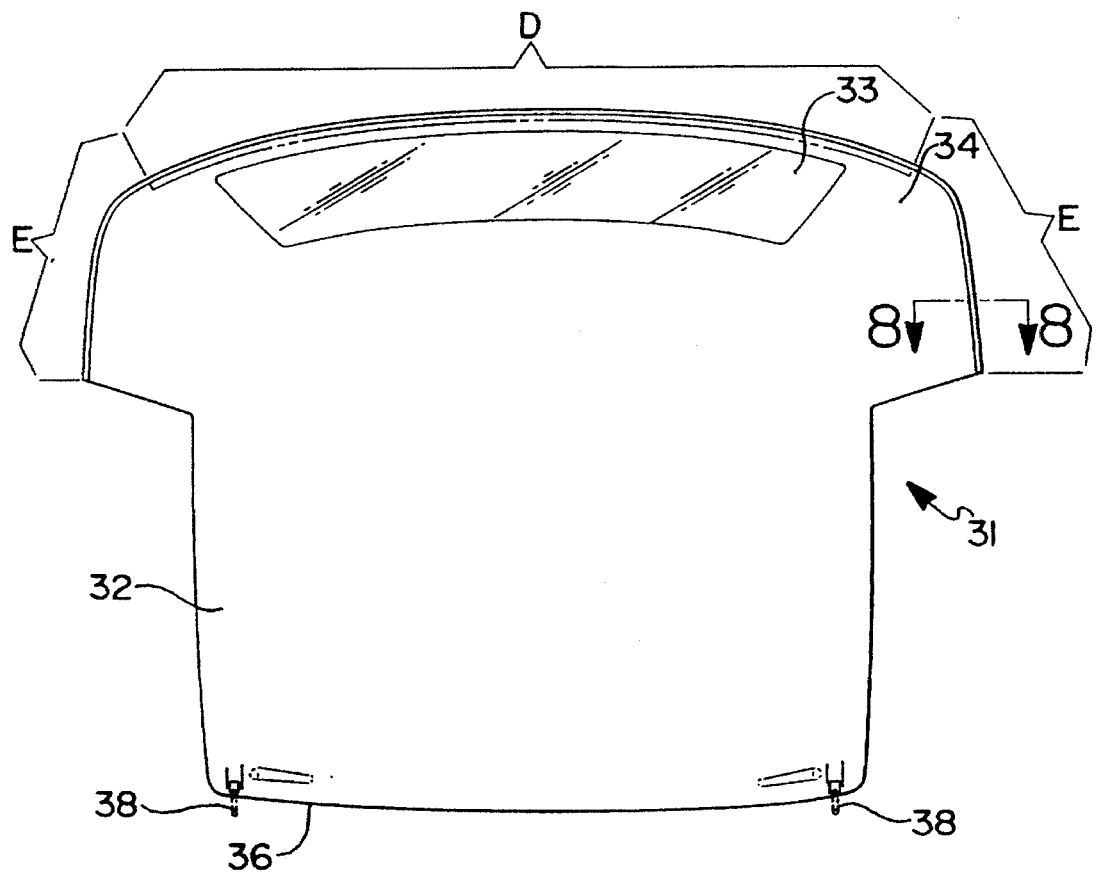
FIG. 7 is a plan view of the substitute top illustrated in FIG. 3.

In sustained periods of inclement weather, such as during winter, a substitute top 31 may be utilized to cover passenger compartment 18, as illustrated in FIGS. 3 and 7. Substitute top 31 comprises a hard fiber glass or other lightweight shell 32, and includes a backlite 33 mounted in a rear bottom portion 34.

Shell 32 includes a front header portion 36 that mounts side header J-hook latches 38 identical to latches 28 on soft top 11. Rear bottom portion 34 terminates in a lower edge 40 which mounts a peripheral seal assembly 42 comprising a plastic base 44 and a compressible rubber seal 46 as detailed in FIGS. 5 and 6.

Figure 8:
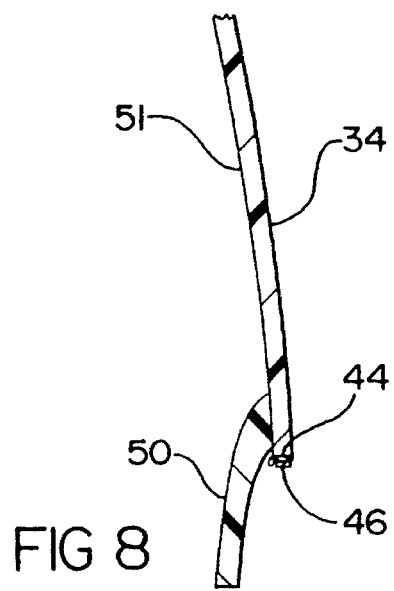
FIG. 8 is an enlarged sectional view taken along line 8—8 of FIG. 7.

Base 44 includes a depending C-clip portion 48 (FIG. 6) along its rear edge (area denoted "D" in FIG. 7), which terminates at the side edges (area denoted "E" & "F" in FIG. 7), as shown in FIG. 5. As shown in FIG. 8, bottom portion 34 mounts side flanges 50 which depend from the interior surface 51 of shell 32 along areas "E"& "F". Storage well 22 is bounded at its rear by a horizontal sheet metal body panel 52 which is capped by edge trim 54 (FIG. 6). At its sides, storage well 22 is bounded by hemmed vertical sheet metal body panels 56 and 58 which are capped by edge trim strips 60 and 62.

Substitute top 31 is mounted as follows. Soft top 11 is lowered into storage well 22, as shown in FIG. 2. Next, substitute top 31 is positioned over passenger compartment 18. Shell 32 is moved rearwardly to engage C-clip portion 48 with and compress rubber seal strip 46 against edge trim strip 54 on the periphery of storage well 22. Shell front edge 36 is then dropped into engagement with windshield header 14. Latches 38 are then latched to engage their J-hooks 64 to header latch surfaces 66 to clamp shell front edge 36 into sealing engagement with windshield header 14. Side flanges 50 serve to locate substitute top 31 on the vehicle body when installed via engagement with the inner surfaces of storage well 22.

It is apparent that mounting of substitute top 31 is extremely simple and quick. Installation of top 31 converts vehicle 10 from its open roadster mode to its closed sedan mode. In this manner, top 31 substitutes exactly for soft top 11 to provide a weather barrier for the vehicle occupants.

Removal of substitute top 31 is similarly simple and quick. Latches 38 are unlatched and top 31 is simply slid forward and upward to lift it off vehicle 10. Substitute top 31 can then be stored for later use.

While only a preferred embodiment has been illustrated and described, obvious modifications thereof are contemplated within the scope of this invention and the following claims.

I claim:

1. In a convertible vehicle having a body enclosing a passenger compartment, a top storage well having side and rear edges, a windshield including a header, a folding soft top movable between a raised position closing the compartment and a lowered position stored in the top storage well, and first latch means carried by the top operable in top raised position for engaging the header to latch the top in sealing engagement with the windshield header, a substitute top for replacing the soft top by closing the passenger compartment when the soft top is lowered, comprising a rigid shell having a front edge engageable with the windshield header when the shell is installed in a position covering the passenger compartment, and a bottom portion including a rear window and side and rear edges engageable with the vehicle body adjacent the top storage compartment, second latch means mounted on the shell for engaging the header when the substitute top is installed to latch the substitute top in sealing engagement with the windshield header, and flange means mounted on the sides of the bottom portion which extend below and engage the inner sides of the storage well edges to locate the bottom portion laterally on the body, and a C-shaped clip mounted on the rear portion which grips the storage well rear edge, wherein said substitute top is held in place solely by engagement of the C-shaped clip with the storage well rear edge and by interengagement of the second latch means, which prevents any forward movement of the top and thereby maintains engagement of the C-shaped clip with the storage well rear edge.

2. The substitute top of claim 1, wherein the first and second latch means are substantially identical.

3. The substitute top of claim 2, wherein the first and second latch means are J-hook latches.

4. The substitute top of claim 3, wherein the second latch means comprise a pair of J-hook latches mounted on the sides of the shell adjacent the front edge.

5. The substitute top of claim 1, including a peripheral seal carried by the bottom portion which is compressed when the C-shaped clip grips the storage well rear edge to sealingly engage the body about the storage well when the substitute top is installed.

6. In a convertible vehicle having a body enclosing a passenger compartment, a top storage well, a windshield including a header, a folding soft top movable between a raised position closing the compartment and a lowered position stored in the top storage well, and a pair of J-hook latches carried by the top for engaging the header to latch the top in sealing engagement with the windshield header, a substitute top for replacing the soft top by closing the passenger compartment when the soft top is lowered, comprising a rigid shell having a front edge engageable with the windshield header when the shell is installed in a position covering the passenger compartment and a rear bottom portion including a rear window and side and rear edges engageable with the vehicle body adjacent the top storage well, a second pair of J-hook latches mounted on the shell for engaging the header when the substitute top is installed to latch the substitute top in sealing engagement with the windshield header, flange means mounted on the sides of the bottom portion which extend below and engage the inner sides of the storage well edges to locate the bottom portion laterally on the body, flange means mounted on the sides of bottom portion which extend below and engage the inner periphery of the sides of the top storage well to locate the bottom portion on the body, and a C-shaped clip which grips the inner periphery of the storage well rear edge, wherein said substitute top is held in place solely by engagement of the C-shaped clip with the storage well rear edge and by interengagement of said second pair of J-hook latches, which prevents any forward movement of the top and thereby maintains engagement of the C-shaped clip with the storage well rear edge.

7. The substitute top of claim 6, including a peripheral seal carried by the bottom portion which is compressed when the C-shaped clip grips the storage well rear edge to sealingly engage the body about the storage well.

8. A method of installing a substitute top on a convertible vehicle body having a soft top which utilizes J-hook latches to latch its soft top to its windshield header to replace the soft top when it is folded for storage in a storage well in the vehicle body, said substitute top comprising a rigid shell having a front edge, a pair of side-mounted J-hook latches and a bottom portion mounting a seal strip having depending side flanges and a C-shaped clip adjacent its rear edge, comprising the steps of a. folding the soft top and storing it in the storage well, b. positioning the substitute top over the passenger compartment, c. moving the shell rearwardly to force the C-clip to grip the storage well rear periphery to compress the seal strip against the periphery of the storage well and mount the bottom portion on the body, d. dropping the shell front edge into engagement with the windshield header with the rear side flanges engaging and extending below the inner side periphery of the storage well to laterally locate the top on the body, and e. latching the J-hook latches to latch the shell front edge into sealing engagement with the windshield header and prevent any forward movement of the C-clip out of engagement with the storage well periphery.

\* \* \* \* \*